United States Patent
Sakakibara

[15] 3,670,174
[45] June 13, 1972

[54] SWITCHING CIRCUIT FOR ELECTRICAL DEVICES OF MOTOR VEHICLES

[72] Inventor: Naoji Sakakibara, Kariya, Japan

[73] Assignee: Aisin Seiki Kabushiki Kaisha, Kariya-shi, Aichi-ken

[22] Filed: Dec. 23, 1970

[21] Appl. No.: 100,863

[30] Foreign Application Priority Data

Dec. 26, 1969 Japan..................................44/1068

[52] U.S. Cl. .............................................307/10 R, 315/81
[51] Int. Cl. .......................................................H02g 3/00
[58] Field of Search ....................307/10, 9, 116; 200/61.54, 200/61.55, 61.56, 61.57; 315/80, 81 X

[56] References Cited

UNITED STATES PATENTS 2,793,262  5/1957  Albert..............................200/61.57

Primary Examiner—Herman J. Hohauser
Attorney—Holman & Stern

[57] ABSTRACT

A switching circuit for a motor vehicle comprises a plurality of switches for a horn and other electrically operated devices of the motor vehicle, all these switches being disposed on the vehicle steering wheel so as to make common use of a single slip ring of a horn switch provided for electrical connection between the steering wheel and steering post of the motor vehicle in general. Upon closure of the horn switch, a horn relay connected between a bus and the collector of a transistor is energized to sound the horn since then conduction is caused in that transistor, whereas, when the other switches are closed, a constant voltage at a point between the switches and a constant voltage line of the switching circuit is divided into desired fractions by means of resistances provided respectively to those other switches and a fixed resistance provided between the aforesaid point and the constant voltage line. These voltage fractions are utilized to energize desired relays of the devices associated with the switches via transistors, zener diodes and the like.

6 Claims, 3 Drawing Figures

PATENTED JUN 13 1972

INVENTOR
Naoji Sakakibara

BY Holman & Stern
ATTORNEYS

SWITCHING CIRCUIT FOR ELECTRICAL DEVICES OF MOTOR VEHICLES

BACKGROUND OF THE INVENTION

This invention relates generally to switching circuits, and in particular to a novel switching circuit for a motor vehicle incorporating a plurality of switches, disposed on a steering wheel of the motor vehicle, for the horn and other electrically operated devices built therein.

Heretofore, in a switching circuit of this kind provided on a motor vehicle steering wheel, as many slip rings for electrical connection between the turnable steering wheel and a stationary steering post have been required as the number of switches incorporated within the circuit. The provision of a highly complex mechanism including these slip rings has therefore been a requisite for such a prior art switching circuit if a certain number of switches for desired electrical devices of a motor vehicle are to be arranged on its steering wheel. Neverthless, the fact remains that the steering wheel is possibly the most convenient and indeed a desirable location for the switches of some of the motor vehicle electrical devices, such for example as a windshield wiper system, headlamps, turn signal lamps, passing lamps and cruise control, not to mention a horn.

The switching circuit of the present invention successfully realizes the centralized control of various electrically operated devices at the steering wheel without need for the provision a plurality of involved slip rings necessary conventionally for said devices.

SUMMARY OF THE INVENTION

It is a primary object of the present invention to provide a simple and inexpensive switching circuit for a plurality of electrically operated devices of a motor vehicle.

Another object of the invention is to provide a switching circuit according to which a plurality of switches for electrically operated devices of a motor vehicle can be disposed on the motor vehicle steering wheel so as to be readily operable by the motor vehicle driver.

Still another object of the invention is to provide a switching circuit for a plurality of electrically operated devices of a motor vehicle including a horn, such that the switches for such devices incorporated in the circuit are all connected in common to one and the same slip ring for a horn switch provided ordinarily to a motor vehicle steering wheel.

These and the various ancillary objects of the invention as well as the characteristic features thereof will become more apparent and understandable from the following detailed description of the invention, taken in connection with the accompanying drawings in which is illustrated a preferred form of the switching circuit in accordance with the invention with relation to a usual motor vehicle steering wheel and a prior art horn circuit associated therewith.

DETAILED DESCRIPTION OF THE INVENTION

Figure 1:
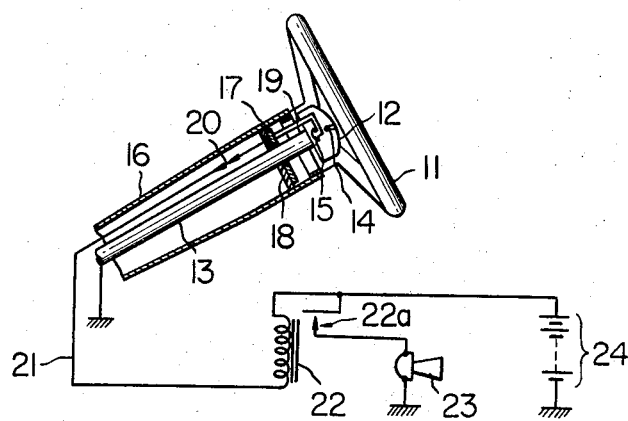
FIG. 1 is a partially broken away side view of a usual motor vehicle steering wheel, in combination with a diagram of a prior art horn circuit.

Referring now to the drawings, FIG. 1 illustrates a steering wheel together with a circuit arrangement for sounding a horn as employed conventionally in motor vehicles in general. A steering wheel 11 has a horn switch push button 12 thereupon. The motion of this steering wheel is to be conveyed to a shaft 13, whose motion will then be transmitted all the way to the vehicle wheels to be steered (not shown). The aforesaid horn switch push button is provided with a contact 14 which, upon depression of the push button 12, causes another contact 15 to be electrically connected to the shaft 13 and hence to be grounded. Inside a steering post 16, enclosing the shaft 13 and other accessories, there is provided an insulator 18 to which is secured a slip ring 17. An electrically conductive member 19 attached to the contact 15 is secured integrally with the steering wheel 11 and, at the other end, is in touch with the slip ring 17, so that this member 19 revolves in sustained touch with the slip ring 17 as the steering wheel turns round. The slip ring 17 is connected to a horn relay 22 via a connector 20 and a conductor 21. A contact 22a, which is kept normally away from the other relay contact, is connected to a horn 23. A power supply 24 has its positive side connected to the relay 22 and its negative side grounded to the vehicle chassis (not shown).

An embodiment of the present invention will now be described with reference to FIG. 3. A power supply 25 for the motor vehicle has its negative side grounded to the vehicle chassis (not shown) and its positive side connected to a bus 26. This positive side of the power supply 25 also is connected to a constant voltage line 28 via a resistance 27. Between the constant voltage line 28 and the aforesaid grounding of the power supply 25 there are interposed a zener diode 29 and a capacitor 30. A fixed resistance 31 is connected to switches 32, 33 and 34 on the aforesaid steering wheel 11 via the connector 20 (refer also to FIGS. 1 and 2). One of these switches, 32, is an ordinary horn switch (like the one illustrated in FIG. 1) while the other switches 33 and 34 are assumed to be those for lighting up the left and right hand side turn signal lamps (not shown), respectively, of the motor vehicle in this embodiment of the invention. Resistances 35 and 36 are connected to these switches 33 and 34, respectively, for dividing a voltage at point $a$ together with the aforesaid fixed resistance 31, as still to be described in detail. A transistor 38 has its base resistance 37 and its collector resistance 39 connected as in the drawing. There is provided a resistance 41 between the collector of this transistor 38 and the base of another transistor 40. Further between the collector of this latter transistor 40 and the aforesaid bus 26 there is interposed a horn relay A, a protective diode 42 being connected in parallel therewith. A normally open contact pair of this horn relay A is connected between the bus 26 and a horn 23'. Diodes 44 and 45 are connected respectively to the normally open contact pair 43 and to the aforesaid point $a$, and commonly to a capacitor 46. Zener diodes 47, 48 and 49 are respectively connected directly to base resistances 53, 54 and 55 of transistors 50, 51 and 52 that the zener diode 48 which is connected to the base resistance 54 of the transistor 51 via a reverse current preventing diode 56. These transistors 50, 51 and 52 have their respective collector resistances 57, 58 and 59 connected as in the drawing. Base resistances 60 and 61 of still other transistors 62 and 63 are respectively connected to the collector of the transistor 51 and to the collector of the transistor 52. Relays B and C are respectively connected between the collector of the transistor 62 and the bus 26 and between the collector of the transistor 63 and the bus 26, protectively diodes 64 and 65 being connected in parallel with the relays B and C, respectively. All the aforementioned transistors 38, 40, 51, 52, 62 and 63 have their emitters connected to the ground.

Figure 2:
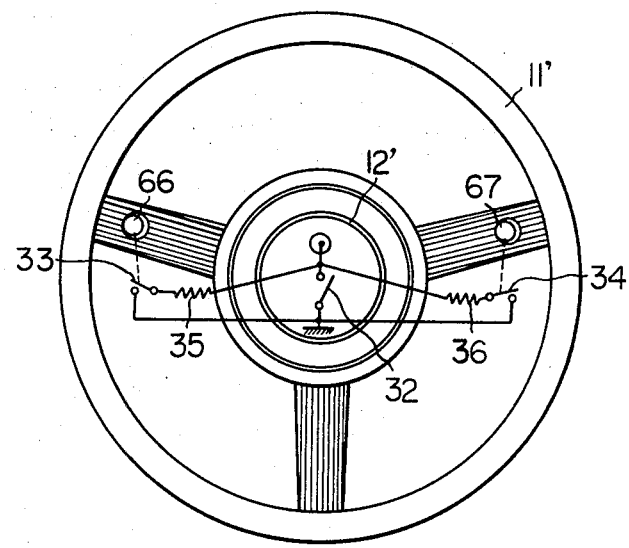
FIG. 2 is a front view of a motor vehicle steering wheel provided with switches incorporated in one form of the switching circuit of the present invention to be succeedingly described in detail.
Figure 3:
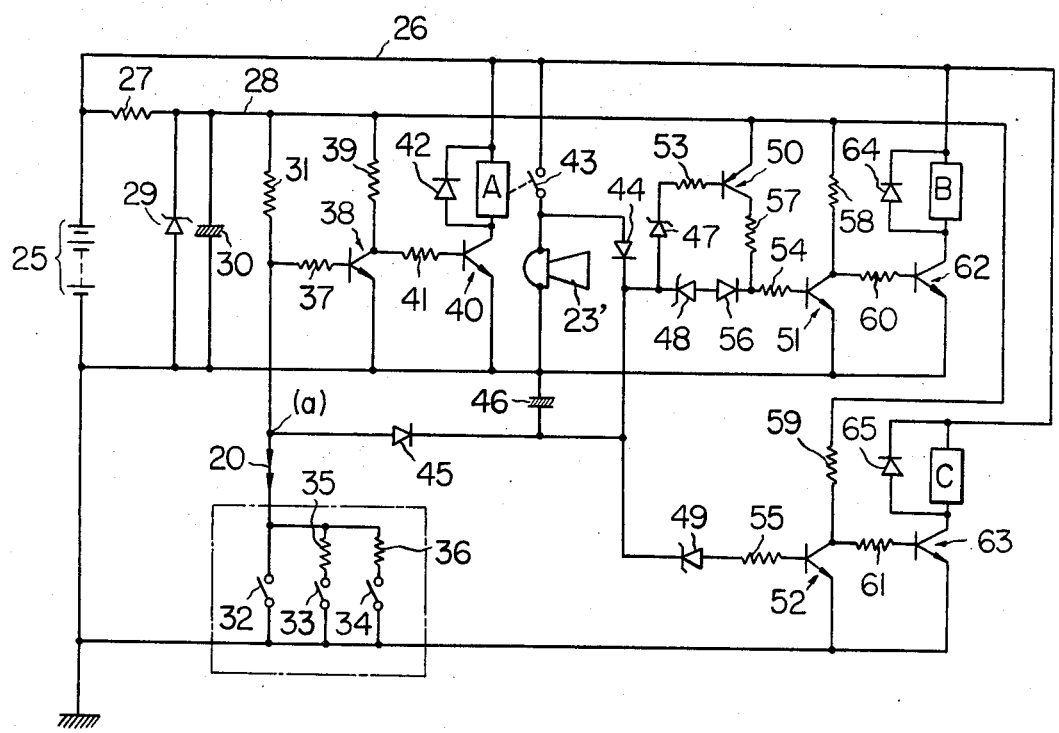
FIG. 3 is a circuit diagram of one form of the switching circuit of the present invention in which are incorporated the switches shown in FIG. 2.

As illustrated in FIG. 2 of the appended drawings, the switches 32, 33 and 34 may be provided a steering wheel 11', with their respective push buttons 12', 66 and 67 disposed thereupon so as to be readily operable by the vehicle driver.

In proceeding to the description of the operation of the switching circuit of the above described configuration in accordance with the present invention, let it be assumed that the resistance 27 has an ohmic value ranging from several tens to hundreds of ohms and that the zener diode 29 has its breakdown voltage predetermined at 9 volts. The constant voltage line 28 will then always have a voltage of 9 volts in case the voltage of the power supply 25 is 9 volts or more. Further the value of the resistance 31 is assumed to be predetermined at 1,000 ohms, the value of the resistance 35 at 5,000 ohms, the value of the resistance 36 at 500 ohms, the breakdown voltage of the zener diode 48 at 7.5 volts, the breakdown voltage of the zener diode 49 at 5.5 volts, and the breakdown voltage of the zener diode 47 at 4 volts. With all these conditions assumed, a voltage of 9 volts will also be applied to the point $a$, as to the constant voltage line 28, if all the switches 32, 33 and 34 provided to the steering wheel 11' are open. The transistors 38, 51 and 52 will then be kept conductive with their base current flow, whereas the other transistors 40, 50, 62 and 63 will be in a nonconducting condition. The capacitor 46 will be charged to approximately 9 volts.

Suppose now that the horn switch push button 12' (FIG. 2) upon the steering wheel 11' is depressed to close the horn switch 32. The point $a$ of the circuit of FIG. 3 is then connected to the ground (the vehicle chassis) through that switch 32 and hence reduced to zero potential. Accordingly the transistor 38 is rendered nonconducting; instead, conduction is caused in the transistor 40 thereby to energize the relay A, which then closes its normally open contact pair 43 to sound the horn 23'. What should be noted here is that, due to the discharge current of the capacitor 46, the transistors 51 and 52 are not immediately rendered nonconducting upon depression of the horn switch push button 12' to sound the horn 23' (a time lag of approximately 0.5 second is caused in this embodiment of the invention).

Simultaneously the aforesaid closure of the normally open contact pair 43 of the relay A causes a voltage close to the voltage of the bus 26 to be impressed to the capacitor 46 via the diode 44, and the transistors 51 and 52 remain conductive while the relays B and C are kept nonoperating.

Let it be assumed now that the switch 33 is closed by the depression of the push button 66 upon the steering wheel 11' (FIG. 2) thereby to light up the left hand side turn signal lamp (not shown) and thus to forewarn a left hand side turn of the motor vehicle. The point $a$ of the switching circuit of FIG. 3 will then be applied with a 7.5-volt fraction of the initail 9 volts, so divided by the resistance 31 (1,000 ohms) and the resistance 35 (5,000 ohms) of the switch 33 closed. The transistor 38 is then conductive, as is the transistor 52 as the zener diode 49 has the breakdown voltage of 5.5 volts as assumed above. The transistor 51 has no base current flow in this instance, however, because the zener diode 48 has the above assumed breakdown voltage of 7.5 volts and because, though the diode 56 may be of germanium type, a voltage drop of approximately 0.4 volt has to be taken for granted. Since the zener diode 47 associated with the transistor 50 has its breakdown voltage assumed to be 4 volts as above, the voltage applied to the base of this transistor 50 will be: $9 - 5.5 = 3.5$ (volts). Hence no conduction takes place in the transistor 50. Only the transistor 62 is then permitted to become conductive to energize the relay B and thus to give warning light to the left hand side turn signal lamp (not shown).

Similarly, upon depression of the push button 67 on the steering wheel 11' (FIG. 2) in order to forewarn a right hand side turn of the motor vehicle, the switch 34 is closed with the result that the point $a$ of the present switching circuit is applied with a 3-volt fraction of the initial 9 volts, so divided by the resistance 31 (1,000 ohms) and the resistance 36 (500 ohms) of that switch 34. The transistor 38 is conductive in this case, too, and conduction also takes place in the transistor 51 due to the simultaneous conduction of the transistor 50 even though the transistor 51 receives no base current from the zener diode 48. No base current flows in the transistor 52 due to the presence of the zener diode 49. Hence conduction is caused in the transistor 63 for energizing the relay C and thereby for giving warning light to the right hand side turn signal lamp (not shown).

While two switches other than the horn switch are incorporated in the preferred form of the switching circuit of the present invention described in the foregoing, it will be obvious that switching circuits including a greater number of switches are easily realizable without departing from the spirit and scope of the invention by adequate selection of the values of voltage dividing resistances and the breakdown voltages of zener diodes in use. Further it is assumed that the invention is not to be restricted by the exact illustration of the drawings and the description thereof but includes other obvious modification and equivalents. For example, where supply voltage with negligible fluctuations is available, the horn relay A may be connected in place of the resistance 31 so as to perform the voltage dividing function of this resistance.

I claim

1. A switching circuit for selectively operating a horn and one or more other electrical devices of a motor vehicle by manual operation of respective switches all of which are located on the steering wheel of the motor vehicle, comprising in combination: a constant voltage DC line; a first fixed resistance and a device-selection circuit-assembly and an only slip ring contact disposed in the steering wheel hub, all the three in series and connected across the constant voltage DC line, said device-selection circuit-assembly comprising a plurality of parallelly connected circuits each of which is composed of a device selector manual-switch and a predetermined resistance connected in series therewith, the device selector manual switches all being disposed on the vehicle steering wheel; a horn circuit and at least one other electrical device circuit of the motor vehicle all connected in parallel and connected across said first fixed resistance; zener diode means in each of said other electrical device circuits of the motor vehicle to control power supply thereto, the breakdown voltages of said zener diode means all being different, so that the electrical devices can be selectively operated all by means of the only slip ring contact, by breaking down the constant DC voltage in the line into a first voltage across one of said predetermined resistances and a second voltage which is suitable for conduction of the zener diode of the particular electrical device, the manual-switch of which is operated.

2. A switching circuit as claimed in claim 1 in which each of said other electrical devices has an associated manual switch.

3. A switching circuit as claimed in claim 1 in which each of said other electrical device circuits has a transistor which when made conductive operates the circuit.

4. A switching circuit as claimed in claim 3 in which the number of said other electrical device circuits is three, and the base voltages of the transistors are selectively made each less than the divided voltage across said first fixed resistance thereby operating a selected one of the electrical devices.

5. A switching circuit as claimed in claim 1 in which a condenser is provided for causing a discharge current to flow so as to prevent an electrical device from operating when a horn circuit manual-switch is actuated.

6. A switching circuit means as claimed in claim 5 in which a diode means is provided so as to adjust current flow in a direction permitting only charging of said condenser.

* * * * *